US010830402B2

(12) United States Patent
Solterbeck

(10) Patent No.: US 10,830,402 B2
(45) Date of Patent: Nov. 10, 2020

(54) TABLE WITH INTEGRATED CHAIRS

(71) Applicant: William D. Solterbeck, Hampton, VA (US)

(72) Inventor: William D. Solterbeck, Hampton, VA (US)

( * ) Notice: Subject to any disclaimer, the term of this patent is extended or adjusted under 35 U.S.C. 154(b) by 47 days.

(21) Appl. No.: 16/350,050

(22) Filed: Sep. 20, 2018

(65) Prior Publication Data

US 2019/0082833 A1 Mar. 21, 2019

Related U.S. Application Data

(60) Provisional application No. 62/606,395, filed on Sep. 21, 2017.

(51) Int. Cl.
| | | |
|---|---|---|
| *A47B 83/02* | (2006.01) | |
| *F21S 8/02* | (2006.01) | |
| *F21V 15/01* | (2006.01) | |
| *F21V 21/108* | (2006.01) | |
| *F21V 23/06* | (2006.01) | |
| *F21V 33/00* | (2006.01) | |
| *F21V 23/04* | (2006.01) | |
| *F16M 13/02* | (2006.01) | |
| *F21S 8/06* | (2006.01) | |
| *A47B 33/00* | (2006.01) | |

(Continued)

(52) U.S. Cl.
CPC ............... *F21S 8/026* (2013.01); *A47B 33/00* (2013.01); *A47B 83/02* (2013.01); *A47B 83/0213* (2017.08); *A47B 83/0215* (2017.08); *A47C 3/18* (2013.01); *A47C 7/563* (2013.01); *F16M 13/027* (2013.01); *F21S 8/065* (2013.01); *F21V 15/01* (2013.01); *F21V 21/108* (2013.01); *F21V 23/045* (2013.01); *F21V 23/0435* (2013.01); *F21V 23/06* (2013.01); *F21V 33/0052* (2013.01); *F21V 33/0056* (2013.01); *F21V 33/0088* (2013.01); *A47B 2051/005* (2013.01); *F21Y 2115/10* (2016.08)

(58) Field of Classification Search
CPC ............................ A47B 83/02; A47B 83/0215
See application file for complete search history.

(56) References Cited

U.S. PATENT DOCUMENTS

| | | | | |
|---|---|---|---|---|
| 396,089 A | * | 1/1889 | Johnson ................ | A47B 83/02 297/157.1 |
| 1,860,291 A | * | 5/1932 | Majcher ................ | A47B 83/02 297/141 |

(Continued)

*Primary Examiner* — David R Dunn
*Assistant Examiner* — Tania Abraham
(74) *Attorney, Agent, or Firm* — Jeffrey F. Riddle

(57) ABSTRACT

A unitary dining unit combining table functions and seating, which dining unit solves the above stated problems, is disclosed. The novel dining unit may be oblong, with opposed convex surfaces, to enable occupants to easily view one another, and to assist in fitting the table or desk efficiently within a square or rectangular room of a building. The unitary dining unit integrates a work surface, e.g., a table or desk surface, with seating. The integrated seating has support arms connecting the seating to the table portion, and maintaining all portions of each seat above the floor, thereby leaving space for and facilitating floor cleaning in the area of the furniture. A perimetric wall serves as an aesthetic skirt concealing seat anchorage elements and other utilitarian components from external view.

7 Claims, 2 Drawing Sheets

(51) Int. Cl.
  *A47C 3/18* (2006.01)
  *A47C 7/56* (2006.01)
  *F21Y 115/10* (2016.01)
  *A47B 51/00* (2006.01)

(56) References Cited

U.S. PATENT DOCUMENTS

| | | | | |
|---|---|---|---|---|
| 2,382,183 | A * | 8/1945 | Thaxton | A47B 83/02 |
| | | | | 297/157.1 |
| 3,033,614 | A * | 5/1962 | Seymour | A47C 9/06 |
| | | | | 297/331 |
| 3,226,154 | A * | 12/1965 | Allen | A47B 83/02 |
| | | | | 297/142 |
| 3,547,484 | A * | 12/1970 | Allen | A47B 83/02 |
| | | | | 297/141 |
| 3,596,985 | A * | 8/1971 | Degagne | A47B 83/02 |
| | | | | 297/77 |
| 3,658,379 | A * | 4/1972 | Black | A47C 9/022 |
| | | | | 297/157.1 |
| 3,688,419 | A * | 9/1972 | Woolman | A47B 41/00 |
| | | | | 434/432 |
| 5,104,183 | A * | 4/1992 | Madsen | A47C 9/022 |
| | | | | 297/142 |
| 5,352,014 | A * | 10/1994 | Allen | A47B 91/02 |
| | | | | 297/142 |
| 5,647,636 | A * | 7/1997 | Allen | A47C 9/06 |
| | | | | 248/285.1 |
| 8,146,514 | B2 * | 4/2012 | Hamilton | A47B 13/06 |
| | | | | 108/50.02 |
| 2007/0046078 | A1 * | 3/2007 | Humfeldt | A47B 83/00 |
| | | | | 297/142 |

* cited by examiner

TABLE WITH INTEGRATED CHAIRS

FIELD OF THE INVENTION

The present invention relates to a table or desk having integrated seating.

BACKGROUND OF THE INVENTION

Dining tables, work desks accommodating plural people, and the like must meet certain demands to maximize their utility. One is that it is usually preferred that those seated at the table or desk top be able to view others at the table or desk. Another demand, which in some ways works against the first, is that the table or desk fit efficiently within a square or rectangular room of a building, where that room is of limited dimensions. It is further desirable to be able to integrate table or desk surfaces with seating. This both enables a single item of furniture to perform functions of what is conventionally many items of furniture. Finally, since such furniture is typically intended for groups gathering for work or for meals, it is desirable to arrive at a design which facilitates floor cleaning in the area of the furniture.

Where aesthetics are concerned, it becomes desirable to conceal from view certain utilitarian components of a table or desk, such as anchorage of integrated seating.

There exists a need for an article of furniture which meets these exacting and conflicting demands.

SUMMARY OF THE INVENTION

The present invention provides a unitary dining unit combining table functions and seating, which dining unit solves the above stated problems. To this end, the novel dining unit may be oblong, with opposed convex surfaces, to enable occupants to easily view one another. This configuration can also assist in fitting the table or desk efficiently within a square or rectangular room of a building. The unitary dining unit integrates a work surface, e.g., a table or desk surface, with seating. The integrated seating has support arms maintaining all portions of each seat above the floor, thereby leaving space for and facilitating floor cleaning in the area of the furniture. A perimetric wall projecting downwardly from the table top serves as an aesthetic skirt concealing seat anchorage elements and other utilitarian components from external view.

The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
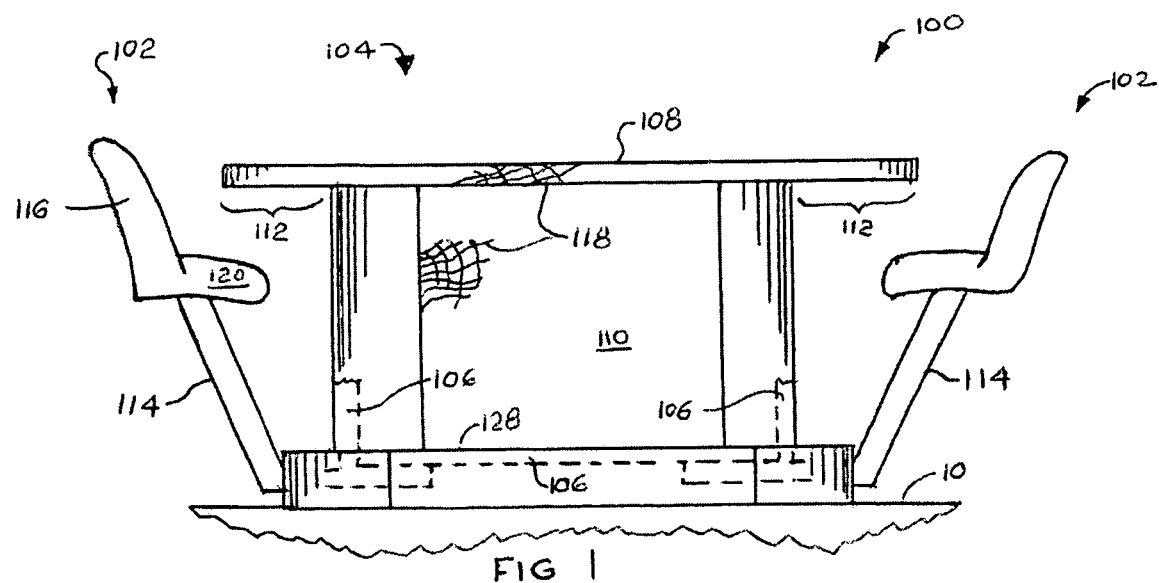
FIG. 1 is a diagrammatic environmental end elevational view of a dining unit according to at least one aspect of the invention.
Figure 3:
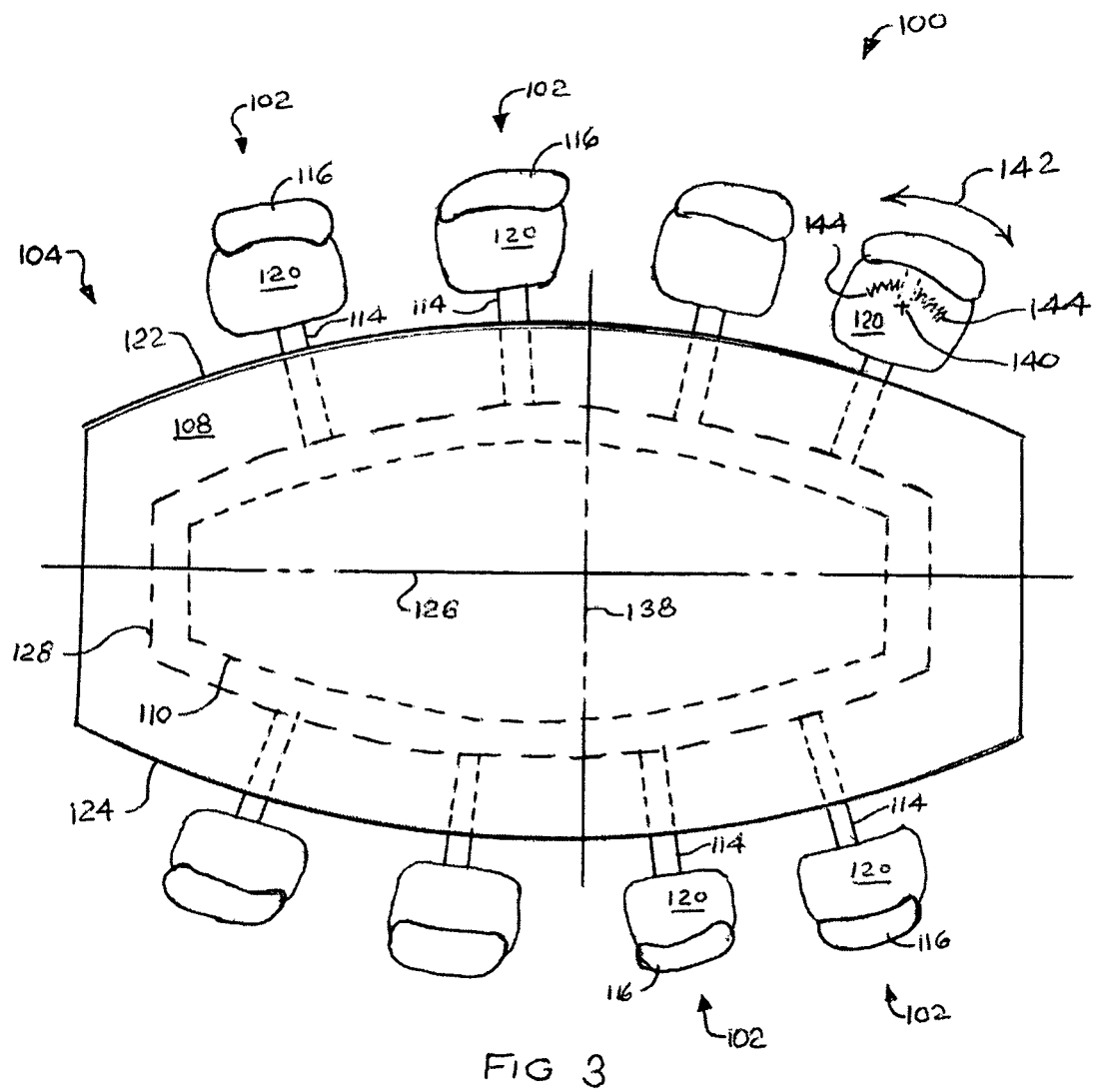
FIG. 3 is a top plan view of a dining unit according to at least one further aspect of the invention, wherein FIGS. 1-3 each show limited aspects of the invention, with some components omitted from each view to preserve clarity of the respective view.

Referring first to FIGS. 1 and 3, according to at least one aspect of the invention, there is shown a dining unit 100 for use on a floor 10. Dining unit 100 incorporates seating units 102, wherein seating units 102 are out of contact with floor 10. Dining unit 100 may comprise a table 104 comprising a frame 106, an oblong table top 108 ultimately fixed to frame 106, and a perimetric wall 110 covering and concealing frame 106 from view from an exterior of perimetric wall 110. Table top 108 may include an overhang portion 112 extending outside perimetric wall 110.

A plurality of seating units 102 are coupled to table 104. For each one of seating units 102, a seating unit support arm 114 spans and connects a respective seating unit 102 with table 104 and is ultimately fixed to frame 106 such that no part of seating unit 102 and no part of seating unit support arm 114 contacts floor 10 when dining unit 100 is in an operable orientation on floor 10. A visible portion of each seating unit support arm 114 makes contact with table 104 at a portion of a base 128 outside perimetric wall 110. The operable orientation is shown in FIG. 1. Seating unit support arm 114 secures seats 120 in place, and bears the weight of occupants of seats 120.

Description of the invention as being dining unit 100 is only to be regarded as a semantic convenience. The novel principles will be understood to apply to devices and furniture intended for purposes other than dining, such as working desks, assembly benches, tables to accommodate meetings and other social events, and for other purposes.

It should be noted that where a plurality of similar components such as seating units 102 is shown, not every one of such components is called out by reference numeral. It will be understood that unnumbered components drawn similarly to numbered components are additional examples of the numbered components.

A seating unit 102 is intended to encompass at a minimum a seat 120 (i.e., a member intended to receive the weight of a human occupant) and seating unit support arm 114. A seating unit 102 may accommodate only one occupant, or alternatively, may comprise a bench accommodating plural occupants. Seating units 102 may include seat backs 116, armrests (not shown), and other features usable with chairs and seats.

Having seating units 102 out of contact with floor 10 enables cleaning operations such as sweeping and vacuum cleaning.

Description of an item being ultimately supported, connected, or otherwise associated with another item implies that the relation may be that of direct contact or connection, or alternatively, contemplates that one or more intervening items may be present.

Perimetric wall 110 may have only an aesthetic function, or alternatively, may also serve a structural function. For aesthetic purposes, perimetric wall 110 (and table top 108) may comprise wood grain 118 visible at exterior surfaces of table 104. Aesthetics are furthered also by concealment of frame 106 and potentially other utilitarian items by table top 108 and perimetric wall 110.

Figure 2:
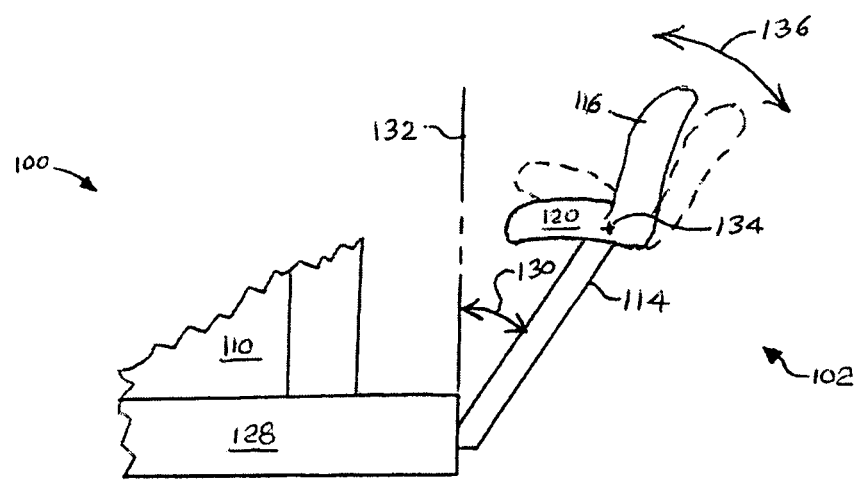
FIG. 2 is a detail view of the lower right of FIG. 1.

Referring to FIGS. 1-3 but particularly to FIG. 3, a dining unit 100 for use on floor 10 incorporating seating units 120 out of contact with floor 10 may comprise table 104, and an oblong table top 108 ultimately fixed to frame 106. Oblong table top 108 may include two opposed curved edge surfaces 122, 124 along a length (along an axis 126) of oblong table top 108, and two opposed straight edge surfaces between opposed convex curved edge surfaces 122, 124. Dining unit 100 (of FIG. 3) may comprise a plurality of seating units 102 coupled to table 104, and for each one of seating units 102, seating unit support arm 114. In dining unit 100 (of FIG. 3), seating units 102 are fixed to table 104 only along opposed convex curved edge surfaces 122, 124.

An oblong table top 108 having opposed curved surfaces 122, 124 serves the purpose of enabling those seated at dining unit 100 to easily view one another, as well as enabling dining unit 100 to fit effectively into building rooms (not shown) of dimensions such that dining unit fits closely to walls of such rooms.

In dining units 100 of FIGS. 1-3, table 104 may comprise a base 128 having a footprint area greater than a footprint of perimetric wall 110. Base 128 may stabilize dining unit 100 on floor 10, and also may serve as a foot rest. Base 128 has transverse dimensions less than corresponding transverse dimensions of table top 108 and greater than corresponding transverse dimensions of perimetric wall 110.

Each seating unit support arm 114 may connect with table 104 at that portion of base 128 outside perimetric wall 110. This arrangement minimizes extent of seating unit support arms 114. This arrangement also enables each seating unit support arm 114 to be oriented at an angular deviation 130 from a vertical direction 132 of less than forty-five degrees when dining unit 100 is in the operable orientation. This facilitates users maneuvering past seating unit support arms 114 when being seated.

With particular reference to FIGS. 2 and 3, each one of seating units 102 may comprise a first seat pivot adjustment feature on a respective seating unit support arm 114, the first seat pivot adjustment feature enabling pivot of a seat 120 of seating unit 102 about a vertical plane and about a horizontal axis (FIG. 3), thereby enabling adjustment of attitude of seat 120. Each seating unit 102 may comprise a second seat pivot adjustment feature on respective seat unit support arm 114, the second seat pivot adjustment enabling pivot of seat 120 of seating unit 102 about a vertical axis, thereby enabling adjustment of azimuthal direction of seat 120.

Dining unit 100 may further comprise a seat return feature operable to selectively return seat 120 to a horizontal attitude (as shown in FIG. 2 in solid lines) and to an azimuthal direction aligned with a respective seating unit support arm 114 (as shown in FIG. 3).

Adjustment of attitude in a vertical plane signifies that a geometric point on seat 120 or on associated seatback 116 will be seen to pivot in and occupy a vertical plane when seat 120 is pivoted about an axis 134 (FIG. 2). Axis 134 may be provided for example by a pivot pin (not shown) which may be part of seating unit support arm 114, and which engages a frame or other structural member (neither shown) of seat 120. Pivot of seat 120 and seatback 116 is indicated by an arrow 136, with one seat position shown in broken lines and another seat position shown in solid lines.

Adjustment of azimuthal direction in a horizontal plane is shown at the upper right of FIG. 3, pivot of seat 120 about a vertical axis represented by cross hair 140 being indicated by an arrow 142.

The seat return feature for either type of adjustment may utilize for example a pair of springs 144 arranged to return seat 120 to the original orientations shown in FIGS. 2 and 3. Each spring 144 may be anchored at one end to seating unit support arm 114 and at an opposed end to seat 120. Detents such as those employing spring loaded ball seating in a groove may supplement springs 144 if desired.

Referring principally to FIG. 3, table top 108 may be bilaterally symmetrical about a central longitudinal axis (seen as axis 126) thereof, and also be bilaterally symmetrical about a central transverse axis 138 thereof.

The present invention is susceptible to modifications and variations which may be introduced thereto without departing from the inventive concepts. Notably, some features may be incorporated into dining unit 100 of FIG. 1, wherein dining unit 100 includes perimetric wall 110, into dining unit 100 of FIG. 3, wherein table top 108 is oblong, or into a dining unit 100 incorporating both types. It is not necessary that dining unit 100 have perimetric wall, nor that dining unit 100 have an oblong table top 108. Also, seats 120 may omit seatbacks 116 if desired, or that seats 120 be of mixed types, some with and others without seatbacks 116.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A dining unit for use on a floor, the dining unit incorporating seating units wherein the seating units are out of contact with the floor, the dining unit comprising:
   a table comprising a frame, an oblong table top ultimately fixed to the frame, the table top having two opposed convex curved edge surfaces along a length of the oblong table top, and two opposed straight edge surfaces between the two opposed convex curved edge surfaces;
   a perimetric wall covering and concealing the frame from view from an exterior of the perimetric wall, the table top having an overhang portion extending outside the perimetric wall;
   a plurality of seating units coupled to the table; and
   for each one of the seating units, a seating unit support arm spanning and connecting a respective seating unit with the table and ultimately fixed to the frame such that no part of the seating unit and no part of the seating unit support arm contacts the floor when the dining unit is in an operable orientation on the floor, wherein
   at least one of the seating units comprises
   a first seat pivot adjustment feature on a respective seating unit support arm, the first seat pivot adjustment feature enabling pivot of a seat of a said seating unit about a horizontal axis, thereby enabling adjustment of attitude;
   and a second seat pivot adjustment feature on the respective seat unit support arm, the second seat pivot adjustment enabling pivot of the seat of said seating unit about a vertical axis, thereby enabling adjustment of azimuthal direction of the seat;
   the dining unit further comprising a seat return feature operable to selectively return the seat to—a horizontal attitude and to an azimuthal direction aligned with a respective seating unit support arm.

2. The dining unit of claim 1, wherein the table further comprises a base having a footprint area greater than a footprint of the perimetric wall, wherein the base has transverse dimensions less than corresponding transverse dimensions of the table top and greater than corresponding transverse dimensions of the perimetric wall.

3. The dining unit of claim 2, wherein a visible portion of each said seating unit support arm makes contact with the table at a portion of the base outside the perimetric wall.

4. The dining unit of claim 1, wherein each said seating unit support arm is oriented at an angular deviation from a vertical direction of less than forty-five degrees when the dining unit is in an operable orientation.

5. The dining unit of claim 1, wherein the table top and the perimetric wall comprise wood grain visible at exterior surfaces of the table.

6. The dining unit of claim 1, wherein the table top is bilaterally symmetrical about a central longitudinal axis thereof, also bilaterally symmetrical about a central transverse axis thereof.

7. A dining unit for use on a floor, the dining unit incorporating seating units wherein the seating units are out of contact with the floor, the dining unit comprising:
   a table comprising a frame, a table top ultimately fixed to the frame;
   a perimetric wall covering and concealing the frame from view from an exterior of the perimetric wall, the table top having an overhang portion extending outside the perimetric wall;
   a plurality of seating units coupled to the table;
   for each one of the seating units, a seating unit support arm spanning and connecting a respective seating unit with the table and ultimately fixed to the frame such that no part of the seating unit and no part of the seating unit support arm contacts the floor when the dining unit is in an operable orientation on the floor, wherein
   at least one of the seating units comprises
      a first seat pivot adjustment feature on a respective seating unit support arm, the first seat pivot adjustment feature enabling pivot of a seat of a said seating unit about a horizontal axis, thereby enabling adjustment of attitude; and
   a second seat pivot adjustment feature on the respective seat unit support arm, the second seat pivot adjustment enabling pivot of the seat of said seating unit about a vertical axis, thereby enabling adjustment of azimuthal direction of the seat, and wherein
   the dining unit further comprises a seat return feature operable to selectively return the seat to a horizontal attitude and to an azimuthal direction aligned with a respective seating unit support arm.

\* \* \* \* \*